(12) United States Patent
Sheret (10) Patent No.: US 12,548,129 B2
(45) Date of Patent: Feb. 10, 2026

(54) APPARATUSES, METHODS AND COMPUTER PROGRAMMES FOR USE IN MODELLING IMAGES CAPTURED BY ANAMORPHIC LENSES

(71) Applicant: Cooke Optics Limited, Leicester (GB)

(72) Inventor: Ian Sheret, Leicester (GB)

(73) Assignee: Cooke Optics Limited, Leicester (GB)

( * ) Notice: Subject to any disclaimer, the term of this patent is extended or adjusted under 35 U.S.C. 154(b) by 179 days.

(21) Appl. No.: 18/688,694

(22) PCT Filed: Aug. 12, 2022

(86) PCT No.: PCT/GB2022/052113
§ 371 (c)(1),
(2) Date: Mar. 1, 2024

(87) PCT Pub. No.: WO2023/031578
PCT Pub. Date: Mar. 9, 2023

(65) Prior Publication Data
US 2025/0124553 A1    Apr. 17, 2025

(30) Foreign Application Priority Data

Sep. 2, 2021 (GB) .................................... 2112543

(51) Int. Cl.
*G06T 5/80* (2024.01)
*G06T 5/20* (2006.01)
(Continued)

(52) U.S. Cl.
CPC ............... *G06T 5/80* (2024.01); *G06T 5/20* (2013.01); *G06T 5/50* (2013.01); *G06T 15/06* (2013.01);
(Continued)

(58) Field of Classification Search
None
See application file for complete search history.

(56) References Cited

U.S. PATENT DOCUMENTS

| 2013/0010371 A1 | 1/2013 | Otani et al. |
| 2019/0042834 A1 | 2/2019 | Gavino et al. |

(Continued)

FOREIGN PATENT DOCUMENTS

| JP | 2004526205 A | 8/2004 |
| JP | 2007071860 A | 3/2007 |

(Continued)

OTHER PUBLICATIONS

GB2112543—Combined Search and Examination Report, dated May 19, 2022, 5 pages.

(Continued)

*Primary Examiner* — Kee M Tung
*Assistant Examiner* — Biao Chen
(74) *Attorney, Agent, or Firm* — 189741 -FP-General; Sikander M. Khan (57) ABSTRACT

The disclosure provides apparatuses, methods and computer programmes to model geometric distortion in an image captured using an anamorphic lens. The apparatus may comprise one or more processors and memory storing one or more image arrays. Each image array may store a distorted image or an undistorted image. A distorted image is representative of pixel values of an image of a scene in a three-dimensional object space captured in a two-dimensional image space on an image plane by an imaging system having an anamorphic lens. An undistorted image is representative of pixel values of a distortion-compensated image of the scene in the three-dimensional object space captured in a two-dimensional image space in which information at locations in image plane in the distorted image have been (Continued)

transformed to remove the geometrical distortion effects of the anamorphic lens.

18 Claims, 6 Drawing Sheets

(51) Int. Cl.
*G06T 5/50* (2006.01)
*G06T 15/06* (2011.01)
*G06T 15/50* (2011.01)
*G06T 19/00* (2011.01)

(52) U.S. Cl.
CPC .......... *G06T 15/506* (2013.01); *G06T 19/006* (2013.01); *G06T 2207/30208* (2013.01); *G06T 2210/56* (2013.01)

(56) References Cited

U.S. PATENT DOCUMENTS

| | | |
|---|---|---|
| 2019/0122643 A1 | 4/2019 | Ohashi et al. |
| 2021/0183023 A1 | 6/2021 | Nakajima et al. |
| 2021/0297597 A1* | 9/2021 | Shibata .............. H04N 23/6812 |

FOREIGN PATENT DOCUMENTS

| | | |
|---|---|---|
| JP | 2009140066 A | 6/2009 |
| JP | 2019056606 A | 4/2019 |
| JP | 2021071516 A | 5/2021 |
| JP | 2021097402 A | 6/2021 |
| WO | 2020170455 A1 | 8/2020 |

OTHER PUBLICATIONS

JP2024-513877—Office Action, dated Apr. 25, 2025, 5 pages.
Jun Liu et al., "Monocular computer vision image calibration method and its application", 2010 2nd International Conference on Advanced Computer Control [online], IEEE, 2010, vol. 3, pp. 144 to 147, [retrieved on Apr. 23, 2025].
Kaikatsu Seki et al., Distortion Correction by Image Processing and Panoramic Images, Ricoh Technical Report No. 23 1997, Ricoh Co., Ltd., Mar. 25, 1997, pp. 45-52.
PCT/GB2022/052113—International Search Report and Written Opinion, dated Dec. 9, 2022, 12 pages.
Vass et al., Applying and removing lens distortion in post production, dated Jan. 1, 2003, 8 pages.

* cited by examiner

APPARATUSES, METHODS AND COMPUTER PROGRAMMES FOR USE IN MODELLING IMAGES CAPTURED BY ANAMORPHIC LENSES

CROSS-REFERENCE TO RELATED APPLICATIONS

This application is a § 371 national stage of PCT International Application No. PCT/GB2022/052113, filed Aug. 12, 2022, claiming priority of UK patent application No. 202112543, filed Sep. 2, 2021, the entire contents of each of which are hereby incorporated by reference into the subject application.

TECHNICAL FIELD

The present disclosure relates to field of image processing, in particular to transform images to account for distortion created by anamorphic lenses.

BACKGROUND

Camera lenses typically create image distortion, where straight lines in the scene are rendered as slightly curved lines in the recorded image. In certain situations (e.g. architectural photography) these distortions are undesirable, and the resulting images are often post-processed using computer software to minimise the distortions. In other situations (e.g. cinematography) the distortions can be aesthetically pleasing and lend a distinctive character to the recorded footage.

However even when the distortions are desirable, it is often important to have detailed knowledge of their exact form. Such knowledge allows captured images to be transformed to add distortions due to the lens, for example so they can be replicated, or remove the distortions to reveal an undistorted image, for example to allow images to be processed in an undistorted image plane. Allowing such transformations for example allows computer generated imagery to be seamlessly merged with real-world footage captured with a distortion-inducing lens. Similarly in purely computer generated works, it may be desirable to simulate the characteristic distortion of a lens in order to benefit from the pleasant appearance.

There is one particular class of lens where the aesthetic aspects of distortion are unusually important—the cinematographic anamorphic lens. Here, a combination of spherical and cylindrical optical elements are used to create a lens which has a different focal length in the vertical and horizontal axes: images are squeezed horizontally so that a wide-screen image will fit onto a standard rectangular image plane. Today, these lenses are selected almost exclusively because of their distinctive character, rather than for any technical reason.

The complex distortion characteristics of anamorphic lenses can be difficult to characterise, and existing techniques may not be sufficient to enable accurate registration of real-world and computer generated image components. There is therefore a continuing need for improved techniques to model and correct lens distortion.

It is in the above context that the present disclosure has been devised.

SUMMARY OF THE DISCLOSURE

Viewed from one aspect, the present disclosure provides apparatus for transforming between distorted and undistorted images to compensate for geometric distortion in the image caused by an anamorphic lens. The apparatus comprises: one or more processors and memory storing one or more image arrays. Each image array storing: a distorted image representative of pixel values of an image of a scene in a three-dimensional object space captured in a two-dimensional image space on an image plane by an imaging system having an anamorphic lens; or an undistorted image representative of pixel values of a distortion-compensated image of the scene in the three-dimensional object space captured in a two-dimensional image space in which information at locations in image plane in the distorted image have been transformed to remove the geometrical distortion effects of the anamorphic lens. The memory also storing instructions for configuring one or more of the processors to transform between the distorted image and the undistorted image using an anamorphic lens distortion model to map pixel values at locations in the distorted image to pixel values at locations in the undistorted image, the anamorphic lens distortion model having the following polynomial relation:

$$x' = x + \sum_{i=0}^{7}\sum_{j=0}^{7} D_{x_{i,j}} \cdot x^i \cdot y^j \quad (1)$$

$$y' = y + \sum_{i=0}^{7}\sum_{j=0}^{7} D_{y_{i,j}} \cdot x^i \cdot y^j \quad (2)$$

where x and y specify points in the distorted image, x' and y' specify the transformed undistorted points in the undistorted image, $D_{x_{i,j}}$ are the x axis distortion coefficients, and $D_{y_{i,j}}$ are the y axis distortion coefficients, and wherein the coefficients $D_{x_{i,j}}$ and $D_{y_{i,j}}$ are non-zero for i+j=2 to characterise a decentre of the lens. The anamorphic lens distortion model is usable by the apparatus to generate an undistorted image in the image array from a distorted image, and vice versa, or to generate a distorted image based on the scene of objects in a three-dimensional object space and a pinhole camera model for the anamorphic lens in the three-dimensional object space.

In embodiments, the coefficients $D_{x_{i,j}}$ are non-zero for i+j=3, 5, 7 where i is odd and j is even. In embodiments, the coefficients $D_{y_{i,j}}$ are non-zero for i+j=3, 5, 7 where i is even and j is odd. In embodiments, all other coefficients in $D_{x_{i,j}}$ and $D_{y_{i,j}}$ are zero or null.

In embodiments, the memory further comprises instructions to: determine, for locations (x, y) in the distorted image, a location ($Ref_x$, $Ref_y$) in a ray reference plane at an entrance pupil for the anamorphic lens the ray travels through from the point in the three-dimensional object space using an anamorphic entrance pupil model based on the following polynomial relation:

$$Ref_x = S_{x_3} \cdot x^3$$

$$Ref_y = S_{y_1} \cdot y + S_{y_3} \cdot y^3$$

where $S_{x_3}$, $S_{y_1}$, and $S_{y_3}$ are anamorphic entrance pupil shift coefficients.

In embodiments, the memory further comprises instructions to: transform a scene of objects in a three-dimensional object space into an undistorted image of the scene in the image array using a pinhole camera model for the anamorphic lens in the three-dimensional object space, optionally using the anamorphic entrance pupil model determined as disclosed herein above to define where the rays pass through the entrance pupil; and transform the undistorted image of the scene in the image array to a distorted version of the image in the image array using the anamorphic lens distortion model. In embodiments, the three-dimensional object space is a virtual object space comprising computer-generated objects, and wherein the distorted version of the image of the scene in the virtual object space created using the pinhole camera model, anamorphic lens distortion model and optionally the anamorphic entrance pupil model, is overlaid on an image of a real world three-dimensional object space captured by the anamorphic lens.

In embodiments, the memory further comprises instructions to: transform a distorted image of a scene in the image array to an undistorted version of the image in the image array using the anamorphic lens distortion model; and transform the undistorted image of the scene in the image array into a projection of the image in a three-dimensional virtual object space using a pinhole camera model for the anamorphic lens in the three-dimensional object space, optionally using the anamorphic entrance pupil model determined as disclosed herein to define where the rays pass through the entrance pupil. In embodiments, the distorted image of the scene is an image of a real world three-dimensional object space captured by the anamorphic lens.

In embodiments, the memory further comprises instructions to: receive real world distorted images captured by the anamorphic lens of test grid markings having known spacings taken at a different distances from the anamorphic lens along the optical axis in the real world three-dimensional object space; determine locations of the distorted test grid markings in the image array; determine values of the distortion coefficients $D_{x_{i,j}}$ and $D_{y_{i,j}}$ to transform the distorted grid markings to an undistorted grid of markings based on the known spacings and centred on the optical axis; and store the determined values as the values of the distortion coefficients $D_{x_{i,j}}$ and $D_{y_{i,j}}$ in the anamorphic lens distortion model stored in memory.

In embodiments, the memory further comprises instructions to: determine values of the anamorphic entrance pupil shift coefficients $S_{x_3}$, $S_{y_1}$, and $S_{y_3}$ based on the locations (x, y) of the distorted test grid markings in the image array for near field test grids to determine the anamorphic entrance pupil model as disclosed herein; and store the determined values as the values of the anamorphic entrance pupil shift coefficients $S_{x_3}$, $S_{y_1}$, and $S_{y_3}$ in the anamorphic entrance pupil model as disclosed herein, stored in memory.

In embodiments, the distortion coefficients $D_{x_{i,j}}$ and $D_{y_{i,j}}$ and optionally the anamorphic entrance pupil shift coefficients $S_{x_3}$, $S_{y_1}$, and $S_{y_3}$ are determined using an optimisation algorithm to fit the anamorphic lens distortion model and optionally the anamorphic entrance pupil model to generate the locations of the distorted test grid markings in the image array.

Viewed from another aspect, the present disclosure provides a method, using the apparatus as disclosed herein, of transforming from a scene of objects in a three-dimensional object space to an image plane to recreate the effect of capturing the scene using an anamorphic lens. The method comprises: transforming a scene of objects in a three-dimensional object space into an undistorted image of the scene in the image array using a pinhole camera model for the anamorphic lens in the three-dimensional object space, optionally using the anamorphic entrance pupil model determined as disclosed to define where the rays pass through the entrance pupil; and transforming the undistorted image of the scene in the image array to a distorted version of the image in the image array using the anamorphic lens distortion model.

In embodiments, the three-dimensional object space is a virtual object space comprising computer-generated objects, and wherein the distorted version of the image of the scene in the virtual object space created using the pinhole camera model, anamorphic entrance pupil model and anamorphic lens distortion model is overlaid on an image of a real world three-dimensional object space captured by the anamorphic lens.

Viewed from another aspect, the present disclosure provides a method, using the apparatus as disclosed herein, of transforming from a distorted image of a scene of objects in a three-dimensional object space to a projection of the image in a three-dimensional virtual object space to negate the effect of capturing the scene using an anamorphic lens. The method comprises: transforming a distorted image of a scene in the image array to an undistorted version of the image in the image array using the anamorphic lens distortion model; and transforming the undistorted image of the scene in the image array into a projection of the image in a three-dimensional virtual object space using a pinhole camera model for the anamorphic lens in the three-dimensional object space, optionally using the anamorphic entrance pupil model determined as disclosed herein to define where the rays pass through the entrance pupil.

In embodiments, the distorted image of the scene is an image of a real world three-dimensional object space captured by the anamorphic lens.

Viewed from another aspect, the present disclosure provides a computer programme product carrying instructions for configuring an apparatus as disclosed herein to operate the methods as disclosed herein.

Viewed from another aspect, the present disclosure provides a computer readable medium storing at least one of: an anamorphic lens distortion model determined as disclosed herein; and an anamorphic entrance pupil model determined as disclosed herein.

BRIEF DESCRIPTION OF THE DRAWINGS

Embodiments of the invention are further described hereinafter with reference to the accompanying drawings, in which.

DETAILED DESCRIPTION

Hereinafter, embodiments of the disclosure are described with reference to the accompanying drawings. However, it should be appreciated that the disclosure is not limited to the embodiments, and all changes and/or equivalents or replacements thereto also belong to the scope of the disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

As used throughout the Figures, features or method steps are shown outlined in broken lines to indicate that such features or method steps are optional features for provision in some embodiments, but which are not provided in all embodiments to implement aspects of the disclosure. That is, aspects of the disclosure do not require these optional features to be included, or steps to be performed, and they are merely included in illustrative embodiments to provide further optional implementation details.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any following embodiments.

Figure 1:
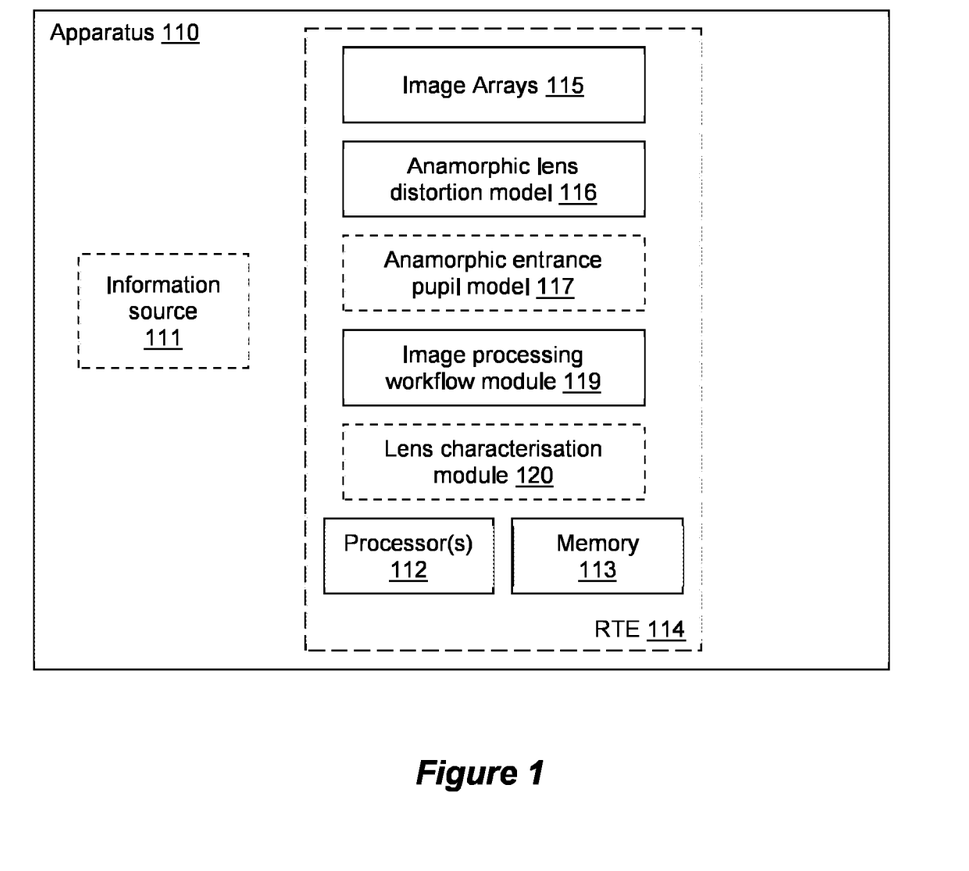
FIG. 1 shows a schematic illustration of an example image processing apparatus in accordance with aspects of the present disclosure.

Reference will now be made to FIG. 1 which shows a schematic illustration of an example image processing apparatus 110 in accordance with aspects of the present disclosure.

The image processing apparatus 110 may include an information source 111, one or more processors 112 and memory 113. The information source 111 is for providing image data or video data captured by an anamorphic imaging system characterised by the apparatus 110 to the apparatus 110 for processing. Alternatively, or in addition, the information source 111 may provide computer generated image data, video data or 3D scene data to the apparatus 110 for processing thereby to generate image data including the computer generated data, including distortions as if captured by the anamorphic imaging system characterised by the apparatus 110. Where image/video data, and computer generated data is taken from different sources and processed together, a composite image may be generated by the apparatus 110 using workflows disclosed herein, including for example real world elements captured by the characterised anamorphic imaging system, and computer generated objects generated in a virtual 3D object space, the composite image appearing as if it were captured by the anamorphic imaging system. In this way computer generated composite images may be generated using the image processing apparatus 110, as if captured by the characterised anamorphic imaging system. The image processing apparatus 110 may operate on data provided from the information source 111 as it is received or generated, to provide real time compositing of images as if captured by the characterised anamorphic imaging system. The information source 111 may generate or store the data locally to image processing apparatus 110, and may represent long term storage such as a hard drive or solid state drive, or in other embodiments the information source 111 may be separate to the image processing apparatus 110, and may generate or store the data remotely and provide it to the image processing apparatus 110 for processing. For example, the information source 111 coupled to the image processing apparatus 110 may include an external anamorphic imaging system and/or an external virtual world environment for generating virtual objects and scenes in an object space. The information from the information source 111 provided to the image processing apparatus 110 may be in any suitable format for processing thereby, including as 2D image data, such as a bitmap, or 3D scene data for imaging using a pinhole camera model of the anamorphic imaging system.

The processor 112 executes instructions that can be loaded into memory 113. The processor 112 can include any suitable number(s) and type(s) of processors or other devices in any suitable arrangement. Example types of processor 112 include microprocessors, microcontrollers, digital signal processors, field programmable gate arrays and application specific integrated circuits.

The memory 113 may be provided by any structure(s) capable of storing and facilitating retrieval of information (such as data, program code, and/or other suitable information on a temporary or permanent basis). The memory 113 can represent a random access memory or any other suitable volatile or non-volatile storage device(s). The memory 113 may also contain one or more components or devices supporting longer-term storage of data, such as a ready only memory, hard drive, flash memory, or optical disc, which may store software code for loading into the memory 113 at runtime. In use, the processor 112 and memory 113 provide a Runtime Environment (RTE) 114 in which instructions or code loaded into the memory 113 can be executed by the processor to generate instances of software modules in the Runtime Environment 114.

The memory 113 comprises instructions which, when executed by the one or more processors 112, cause the one or more processors 112 to instantiate one or more image arrays 115, an anamorphic lens distortion model 116 and an image processing workflow module 119. In embodiments, the memory may also comprise instructions which, when executed by the one or more processors 112, cause the one or more processors 112 to instantiate an anamorphic entrance pupil model 117 and/or a lens characterisation module 120.

Figure 4:
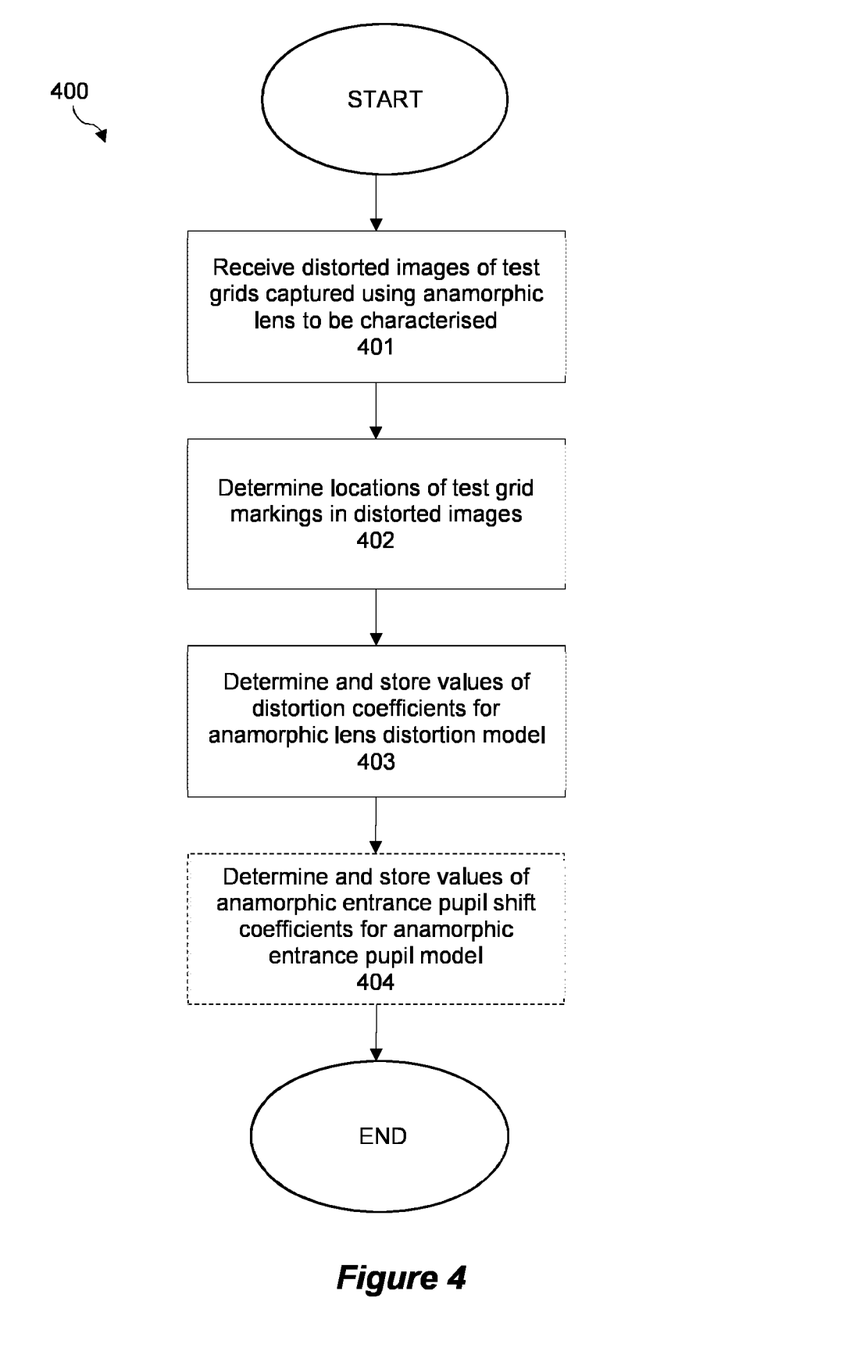
FIG. 4 shows an example anamorphic lens characterisation process for determining the anamorphic entrance pupil model and anamorphic lens distortion model to characterise the anamorphic imaging system, in which distorted images of test grids are captured using the anamorphic lens, in accordance with an aspect of the present disclosure.

By implementing these component functional modules, the apparatus 110 may be configurable by instructions stored in memory 113 and implemented in RTE 114 to carry out the runtime method described in relation to FIG. 4 for determining the anamorphic entrance pupil model and anamorphic lens distortion model to characterise an anamorphic imaging system modelled by the apparatus 110. The apparatus 110 may also be configurable by instructions stored in memory 113 and implemented in RTE 114 to carry out the runtime method described in relation to FIG. 5 for transforming a 3D scene in an object space to a distorted image of the 3D scene characteristic of the anamorphic imaging system. The apparatus 110 may also be configurable by instructions stored in memory 113 and implemented in RTE 114 to carry out the runtime method described in relation to FIG. 6 for transforming a distorted image characteristic of the anamorphic imaging system to a projection of the image in 3D object space.

Figure 2A:
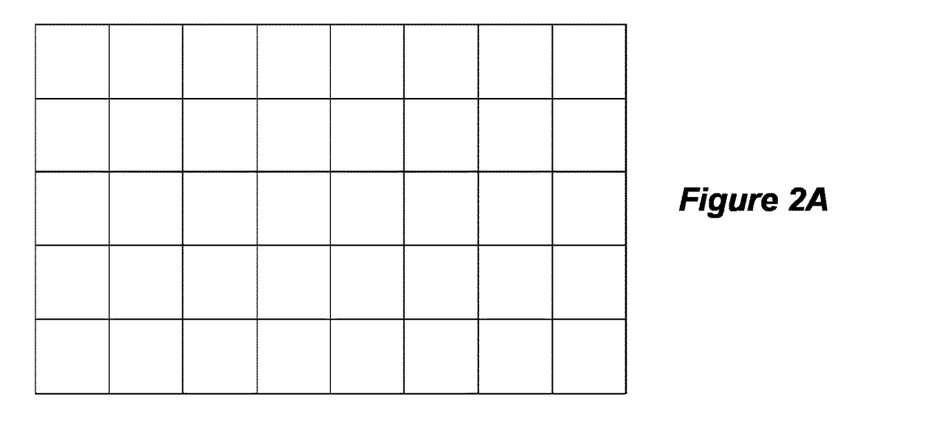
FIG. 2A shows a test grid for imaging by an anamorphic imaging system for use in characterising the imaging system.
Figure 2B:
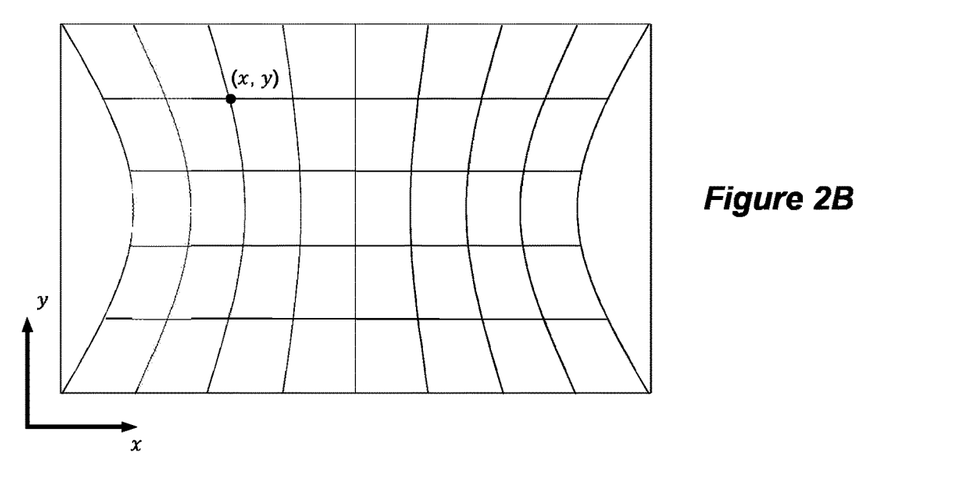
FIG. 2B shows a distorted image of the test grid shown in FIG. 2A, as captured by the anamorphic imaging system, in which the distortion characteristics of the anamorphic lens are shown.
Figure 2C:
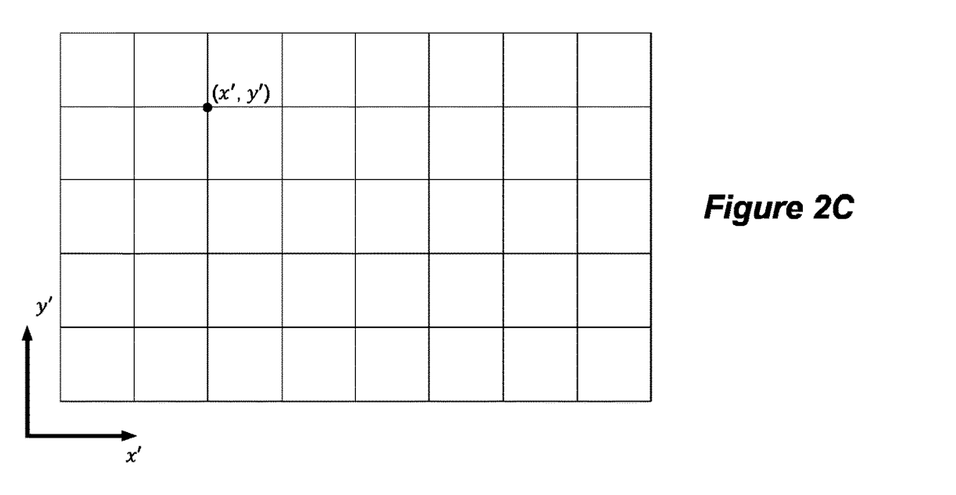
FIG. 2C shows an undistorted image of the test grid produced from the distorted image shown in 2B, using an example image processing apparatus as shown in FIG. 1.

Referring now to FIG. 2A, FIG. 2B and FIG. 2C, the imaging of an object space by an anamorphic imaging system, and the transforming of the image by the image processing apparatus 110 to generate an undistorted image will now be described.

FIG. 2A shows an example test grid for imaging by an anamorphic imaging system for use in characterising the imaging system. The grid has markings at known, consistent spacings, and, as will be described below in relation to FIGS. 3 and 4, can be imaged by the anamorphic imaging system at distances in an object space, with the captured distorted images being used to determine coefficients to characterise the anamorphic imaging system in the anamorphic lens distortion model 116 and anamorphic entrance pupil model 117.

FIG. 2B shows a distorted image of the test grid shown in FIG. 2A, as captured by an anamorphic imaging system to be characterised by the image processing apparatus 110, in which the distortion characteristics of the anamorphic lens are shown. As can be seen, by virtue of the anamorphic lens having a combination of spherical and cylindrical optical elements giving a different focal length in the vertical and horizontal axes, captured images are squeezed horizontally giving rise to distortions that are characteristic of each anamorphic lens. Working with and compositing images to include computer generate objects in this distorted image space is challenging as the composited computer generated content will not be correctly registered in a real-world scene and will require extensive manual editing in order to synthesise acceptable composited images that correctly appear to have been captured using an anamorphic imaging system. It should be noted that the distortions of the test grid shown in FIG. 2B by capturing an image of the test grid of FIG. 2A using an anamorphic imaging system are, for ease of understanding, simplified and exaggerated. It should be noted that accurate characterisation of each anamorphic lens in accordance with the present disclosure is needed to properly handle and process images as if captured thereby, to allow for example, compositing of computer generated imagery or simulation of the anamorphic imaging system using a virtual camera.

Thus, to allow handling or creation of images actually or apparently captured by the anamorphic imaging system and to facilitate seamless compositing, the image processing apparatus 110 may be used to transform between distorted and undistorted images to add or remove the distortion effects of the anamorphic imaging system.

In this respect, the image processing apparatus 110 maintains in RTE 114 one or more image arrays 115 for receiving and storing distorted or undistorted images, such as individual images or video frames captured by an anamorphic imaging system and provided by information source 111, and/or images of scenes of 3D virtual worlds provided by information source 111. The image processing workflow module 119 and/or the lens characterisation module 120 may operate on image data stored in the image arrays 115 to add or remove the distortion effects of the anamorphic imaging system or to characterise the anamorphic imaging system.

Thus, by way of example, the distorted image of the test grid as shown in FIG. 2B that has been captured by the anamorphic imaging system may be received in an image array 115 of the image processing apparatus 110 from information source 111.

The image processing apparatus 110 in use includes an anamorphic lens distortion model 116 characterising the anamorphic imaging system. The anamorphic lens distortion model 116 can be used to transform between distorted and undistorted images to add or remove the distortion effects of the anamorphic imaging system.

For any measured point in the distorted image stored in image array 115, the anamorphic lens distortion model 116 specifies a correction which will convert a point at a location (x, y) in a distorted image into a point at a location (x', y') in an undistorted version of the image. The undistorted coordinates are determined by the following polynomial relation defined to the seventh order:

$$x' = x + \sum_{i=0}^{7}\sum_{j=0}^{7} D_{x_{i,j}} \cdot x^i \cdot y^j \quad (1)$$

$$y' = y + \sum_{i=0}^{7}\sum_{j=0}^{7} D_{y_{i,j}} \cdot x^i \cdot y^j \quad (2)$$

Here, x and y specify a point in the distorted image, representative of pixel values of an image of a scene in a three-dimensional object space captured in a two-dimensional image space on an image plane by an imaging system having an anamorphic lens.

Also, x' and y' specify the mapped (i.e. distortion-corrected) point in the undistorted image, representative of pixel values of a distortion-compensated image of the scene in the three-dimensional object space captured in a two-dimensional image space in which information at locations in image plane in the distorted image have been transformed to remove the geometrical distortion effects of the anamorphic lens.

$D_{x_{i,j}}$ are the x axis distortion coefficients, given by equation (3), and $D_{y_{i,j}}$ are the y axis distortion coefficients, given by equation (4).

$$\begin{bmatrix} D_{x_{0,0}} & D_{x_{0,1}} & \cdots & D_{x_{0,7}} \\ D_{x_{1,0}} & D_{x_{1,1}} & \cdots & D_{x_{1,7}} \\ \cdots & \cdots & \cdots & \cdots \\ D_{x_{7,0}} & D_{x_{7,1}} & \cdots & D_{x_{7,7}} \end{bmatrix} = \quad (3)$$

$$\begin{bmatrix} 0 & 0 & D_{x_{0,2}} & 0 & 0 & 0 & 0 & 0 \\ 0 & D_{x_{1,1}} & D_{x_{1,2}} & 0 & D_{x_{1,4}} & 0 & D_{x_{1,6}} & 0 \\ D_{x_{2,0}} & 0 & 0 & 0 & 0 & 0 & 0 & 0 \\ D_{x_{3,0}} & 0 & D_{x_{3,2}} & 0 & D_{x_{3,4}} & 0 & 0 & 0 \\ 0 & 0 & 0 & 0 & 0 & 0 & 0 & 0 \\ D_{x_{5,0}} & 0 & D_{x_{5,2}} & 0 & 0 & 0 & 0 & 0 \\ 0 & 0 & 0 & 0 & 0 & 0 & 0 & 0 \\ D_{x_{7,0}} & 0 & 0 & 0 & 0 & 0 & 0 & 0 \end{bmatrix}$$

$$\begin{bmatrix} D_{y_{0,0}} & D_{y_{0,1}} & \cdots & D_{y_{0,7}} \\ D_{y_{1,0}} & D_{y_{1,1}} & \cdots & D_{y_{1,7}} \\ \cdots & \cdots & \cdots & \cdots \\ D_{y_{7,0}} & D_{y_{7,1}} & \cdots & D_{y_{7,7}} \end{bmatrix} = \quad (4)$$

$$\begin{bmatrix} 0 & 0 & D_{y_{0,2}} & D_{y_{0,3}} & 0 & D_{y_{0,5}} & 0 & D_{y_{0,7}} \\ 0 & D_{y_{1,1}} & 0 & 0 & 0 & 0 & 0 & 0 \\ D_{y_{2,0}} & D_{y_{2,1}} & 0 & D_{y_{2,3}} & 0 & D_{y_{2,5}} & 0 & 0 \\ 0 & 0 & 0 & 0 & 0 & 0 & 0 & 0 \\ 0 & D_{y_{4,1}} & 0 & D_{y_{4,3}} & 0 & 0 & 0 & 0 \\ 0 & 0 & 0 & 0 & 0 & 0 & 0 & 0 \\ 0 & D_{y_{6,1}} & 0 & 0 & 0 & 0 & 0 & 0 \\ 0 & 0 & 0 & 0 & 0 & 0 & 0 & 0 \end{bmatrix}$$

As can be seen, the coefficients $D_{x_{i,j}}$ are non-zero for i+j=3, 5, 7 where i is odd and j is even. Also, the coefficients $D_{y_{i,j}}$ are non-zero for i+j=3, 5, 7 where i is even and j is odd. All other coefficients in $D_{x_{i,j}}$ and $D_{y_{i,j}}$ are zero or null.

Thus only 24 of the 98 distortion coefficients in $D_x$ and $D_y$ are non-zero. These particular coefficients alone can characterise an anamorphic imaging system to provide high accuracy whilst keeping the computational workload manageable. In addition, the careful selection of non-zero terms minimises the number of degrees-of-freedom in the model, which makes characterisation of manufactured lenses more straightforward.

Importantly, as can be seen, the coefficients $D_{x_{i,j}}$ and $D_{y_{i,j}}$ are non-zero for i+j=2 to characterise a decentre of the lens. These components allow the distortion effects of the anamorphic lens to be appropriately characterised and compensated.

By using a suitable transformation process such as a warp in a workflow of the image processing workflow module 119 in conjunction with the anamorphic lens distortion model 116, the image processing apparatus 110 can thus transform between distorted and undistorted images and vice versa, mapping pixel values between their locations to add or remove the distortion effects of the anamorphic imaging system. For example, the use of anamorphic lens distortion model 116 allows the image processing apparatus 110 to transform the distorted image shown in FIG. 2B received and stored in the image array 115 to an undistorted image, as shown in FIG. 2C. As can be seen, by this processing, the anamorphic lens distortion model 116 is used to map the pixel values for a point at a location (x, y) in the distorted image shown in FIG. 2B to a point (x', y') in the undistorted image shown in FIG. 2C.

The anamorphic lens distortion model 116 described above assumes that all rays that enter the anamorphic imaging system pass through a single point in 3D space, i.e. a pinhole. In this way, the image processing workflow module 119 can use the anamorphic lens distortion model 116 in conjunction with a pinhole camera model for the anamorphic imaging system to transform between 3D scenes in object space and distorted and undistorted images of the 3D scenes.

However real lenses deviate from this pinhole camera model, and in anamorphic lenses this can have a significant effect on reconstruction accuracy. This effect is typically important when imaging objects which are relatively close to the lens (roughly 1 meter or less).

For anamorphic lenses, these near-field distortions are particularly significant. In addition to the well-understood physical effects present on spherical lenses, anamorphic lenses are uniquely subject to distortions which arise from an offset in the paraxial entrance pupil position between the vertical and horizontal axes. Thus in embodiments, the image processing apparatus 110 includes an anamorphic entrance pupil model 117 which characterises and can be used to correct a pinhole camera model for this offset, giving a significantly more accuracy in handling images of nearby objects captured using the anamorphic imaging system or computer generated objects simulated to be imaged by the image processing apparatus 110 using the anamorphic entrance pupil model 117 and a pinhole camera model.

Figure 3:
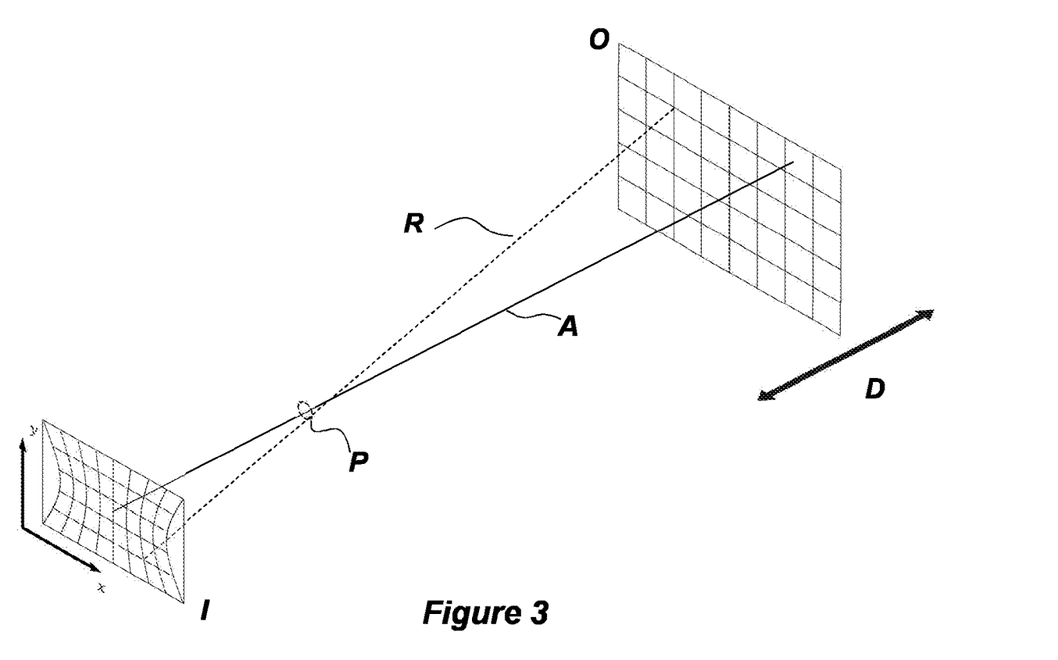
FIG. 3 illustrates an example model of the anamorphic imaging system relating a test grid in object space to a distorted image using a pinhole camera model, anamorphic entrance pupil model and anamorphic lens distortion model, by an example image processing apparatus as shown in FIG. 1.

Referring to FIG. 3, which shows an example model of the anamorphic imaging system relating a test grid in object space to a distorted image using a pinhole camera model, anamorphic entrance pupil model and anamorphic lens distortion model 116, the anamorphic entrance pupil model 117 calculates position at which the rays from locations in an object space O (in this case containing the test grid of FIG. 2A) intersect a plane, called ray reference plane P, that is normal to the optical axis A and intersects horizontal axis paraxial entrance pupil. The position at which a ray intersects the ray reference plane P is given by the anamorphic entrance pupil model 117 which is specified by the following polynomial relations in the x and the y coordinates in the captured distorted image I:

$$Ref_x = S_{x_3} \cdot x^3$$
$$Ref_y = S_{y_1} \cdot y + S_{y_3} \cdot y^3$$
$$Ref_z = 0$$

Here, x and y specify the captured (i.e. distorted) point, exactly as used in the previous distortion calculation for the anamorphic lens distortion model 116. $S_{x_3}$, $S_{y_1}$, and $S_{y_3}$ are the anamorphic entrance pupil shift coefficients. ($Ref_x$, $Ref_y$, $Ref_z$) are the coordinates at which the ray intersects the ray reference plane.

For the image processing workflow module 119 of the image processing apparatus 110 to map between rays from a scene in 3D object space O and points on an image plane I using a pinhole camera model as adapted by the anamorphic entrance pupil model 117, only two pieces of information are needed, the first is the direction of the ray through the pinhole which is determined by the location in the image plane I or object space O, and the second is the point in the ray reference plane R that the ray passes through, which is determined by the anamorphic entrance pupil model 117. In this way, these near field effects can be compensated for allowing accurate handling of transformations of distorted images including nearfield objects, for example to composite in an image compute generated objects located near the entrance pupil of the anamorphic imaging system in a virtual object space.

In this way, as can be seen in FIG. 3, in embodiments image processing workflow module 119 of the image processing apparatus 110 implements workflows that use a pinhole camera model for the anamorphic lens in the three-dimensional object space, adapted by the anamorphic entrance pupil model 117 to define where the rays pass through the entrance pupil, in conjunction with anamorphic lens distortion model 116, in order to map rays from a scene of objects in a three-dimensional object space (such as a virtual object space received from information source 111) into an distorted image of the scene in the image array 115. The workflow may perform this modelling and transformation from object space to distorted image in one shot, or there may be an explicit intervening step in which the pinhole camera model, adapted by the anamorphic entrance pupil model 117, is used to generate in the image array 115 an undistorted image, before subsequent distortion using the anamorphic lens distortion model 116 to recreate the distortion effects of the anamorphic lens. It should be noted here that the use of the pinhole camera model, anamorphic entrance pupil model and anamorphic lens distortion model can map between rays from a scene in 3D object space O and points on an image plane I in either direction.

An example process 400 implemented by the lens characterisation module 120 for characterising an anamorphic imaging system will now be described in relation to FIG. 4. Characterising an anamorphic imaging system in accordance with aspects of this disclosure includes determining the distortion coefficients $D_{x_{i,j}}$ and $D_{y_{i,j}}$ of the anamorphic lens distortion model 116, but where an anamorphic entrance pupil model 117 is used to adapt a pinhole camera model of the anamorphic imaging system, the workflow may also include determining the anamorphic entrance pupil shift coefficients $S_{x_3}$, $S_{y_1}$, and $S_{y_3}$ of the anamorphic entrance pupil model 117.

The process 400 begins in step 401 with the image processing apparatus 110, receiving and storing in image arrays 115 real world distorted images captured by the anamorphic lens of test grid markings, for example as shown in FIG. 2A, having known spacings. As shown in FIG. 3, the images of the test grid may be taken at a different distances D from the anamorphic lens along the optical axis A in the real world three-dimensional object space O. The use of multiple distorted test grid images taken at different distances along the optical axis allows the determination of the distortion coefficients $D_{x_{i,j}}$ and $D_{y_{i,j}}$ and the anamorphic entrance pupil shift coefficients $S_{x_3}$, $S_{y_1}$, and $S_{y_3}$ (if used) to be of high accuracy for locations throughout the object space.

In step 402, the image processing apparatus 110 determines locations of the distorted test grid markings in the image array 115 for each distorted test grid image. This may be, in the example shown in FIG. 2A, intersections between the horizontal and parallel lines of the test grid, the spacing between which is constant in the plane of the test grid in the object space O. However, as can be seen in FIG. 2B, the spacing between these test grid intersections is distorted by the anamorphic lens in the captured image.

Thus, in step 403, the image processing apparatus 110 determines the values of the distortion coefficients $D_{x_{i,j}}$ and $D_{y_{i,j}}$ to transform the distorted grid markings to an undistorted grid of markings based on the known spacings and centred on the optical axis. As explained above, the determination of the distortion coefficients $D_{x_{i,j}}$ and $D_{y_{i,j}}$ allows an anamorphic lens distortion model 116 to be generated which characterises the distortion effects of the anamorphic imaging system. These determined values are then stored as the values of the distortion coefficients $D_{x_{i,j}}$ and $D_{y_{i,j}}$ in the anamorphic lens distortion model 116 stored in memory.

Similarly, in step 404, if an anamorphic entrance pupil model 117 is to be generated for the anamorphic imaging system, the image processing apparatus 110 determines values of the anamorphic entrance pupil shift coefficients $S_{x_3}$, $S_{y_1}$, and $S_{y_3}$, based on the locations (x, y) of the distorted test grid markings in the image array for near field test grids. These determined values are then stored as the values of the anamorphic entrance pupil shift coefficients $S_{x_3}$, $S_{y_1}$, and $S_{y_3}$ in the anamorphic entrance pupil model 117 stored in memory.

In the steps 403 and 404, the lens characterisation module 120 may determine the distortion coefficients $D_{x_{i,j}}$ and $D_{y_{i,j}}$ and optionally the anamorphic entrance pupil shift coefficients $S_{x_3}$, $S_{y_1}$, and $S_{y_3}$ using an optimisation algorithm to fit the anamorphic lens distortion model and optionally the anamorphic entrance pupil model to generate the locations of the captured distorted test grid markings in the image arrays 115. For example, a least squares fitting algorithm could be used to find the values of the distortion coefficients $D_{x_{i,j}}$ and $D_{y_{i,j}}$ and optionally the anamorphic entrance pupil shift coefficients $S_{x_3}$, $S_{y_1}$, and $S_{y_3}$ that cause the anamorphic lens distortion model 116 and optionally the anamorphic entrance pupil model 117 to best recreate the captured test grid images.

It should be noted that although in the embodiment shown in FIG. 1, the process 400 for characterising an anamorphic imaging system is performed by the image processing apparatus 110 under process control by the lens characterisation module 120, the process 400 characterising the anamorphic imaging system may be performed elsewhere, for example by a manufacturer of anamorphic lenses, and the characterisation of the anamorphic imaging system (in the form of the distortion coefficients $D_{x_{ij}}$ and $D_{y_{ij}}$ and anamorphic entrance pupil shift coefficients $S_{x_3}$, $S_{y_1}$, and $S_{y_3}$) may be received at the image processing apparatus 110 for example over the Internet.

Once the distortion coefficients $D_{x_{ij}}$ and $D_{y_{ij}}$ and optionally the anamorphic entrance pupil shift coefficients $S_{x_3}$, $S_{y_1}$, and $S_{y_3}$ have been determined, the anamorphic imaging system and in particular the anamorphic lens is then characterised by the anamorphic lens distortion model 116 and optionally the anamorphic entrance pupil model 117 and can be used by the image processing workflow module 119 to add or remove the distortion effects of the characterized anamorphic lens, and to transform between a scene in a 3D object space (such as one containing computer generated content) and an image plane directly recreating the distortion and near field imaging effects of the anamorphic imaging system.

Thus, example workflow processes 500, 600 implemented by the image processing workflow module 119 for processing the images for a characterised anamorphic imaging system will now be described in relation to FIGS. 5 and 6.

Figure 5:
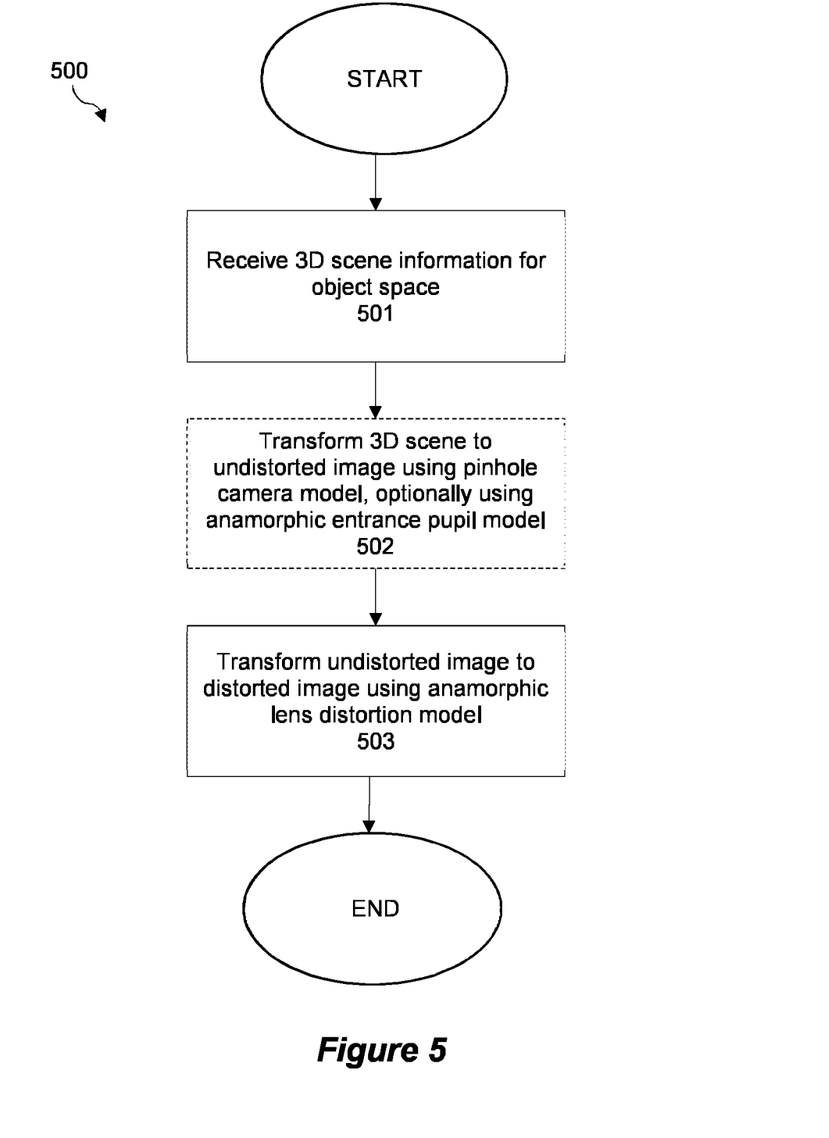
FIG. 5 shows an example image workflow process for transforming a 3D scene in an object space to a distorted image of the 3D scene characteristic of the anamorphic imaging system using a pinhole camera model, anamorphic entrance pupil model and anamorphic lens distortion model, in accordance with an aspect of the present disclosure.

Referring to FIG. 5, the workflow process 500 is for transforming from a scene of objects in a three-dimensional object space to an image plane to recreate the effect of capturing the scene using the characterised anamorphic lens.

In step 501, a scene of objects in a three-dimensional object space is received by the image processing workflow module 119, for example from information source 111. The scene of objects in a three-dimensional object space may be of a virtual object space comprising computer-generated objects, and may be received in any form suitable for processing by the image processing workflow module 119 for use with a pinhole camera model to create an image of the scene in an image plane.

In step 502, the image processing workflow module 119 transforms the received scene of objects in the three-dimensional object space into an undistorted image of the scene in the image array 115 using a pinhole camera model for the anamorphic lens in the three-dimensional object space, as illustrated in FIG. 3. In embodiments, the anamorphic entrance pupil model 117 determined as described above, may be used to adapt the pinhole camera model to define where the rays pass through the entrance pupil in the ray reference plane. In this way, the near field effects of the anamorphic lens on objects in the 3D object space close to the anamorphic imaging system can be taken into account in the undistorted image generated by the pinhole camera model.

Then, in step 503, the image processing workflow module 119 transforms the undistorted image of the scene in the image array 115 to a distorted version of the image in the image array 115 using the anamorphic lens distortion model 116. Thereafter the process for transforming the image ends and may be repeated, for example, for subsequent image frames in a video.

In this way, a distorted image of objects in the 3D object space can be created that accurately recreates the capturing of the objects by the anamorphic imaging system. In embodiments, the distorted version of the image of the scene in the virtual object space created using the pinhole camera model, anamorphic entrance pupil model and anamorphic lens distortion model is overlaid on an image of a real world three-dimensional object space captured by the anamorphic lens. Thus the image processing apparatus 110 may be used to seamlessly and accurately composite images synthesising computer generated objects with real world images captured as if both were captured using the anamorphic imaging system, without requiring manual adaptation or intervention. In this way, real time compositing of computer generated objects in real world footage captured by an anamorphic lens is enabled.

Although in the process 500 above, in the intervening step 502 an undistorted image is generated, in embodiments, the undistorted image may not be generated and, rather, the process 500 may operate the pinhole camera model (optionally adapted by the anamorphic entrance pupil model 117) and anamorphic lens distortion model 116 together in one step, such that rays from the 3D object space are mapped directly to locations in a distorted image of the scene stored in image array 115.

Figure 6:
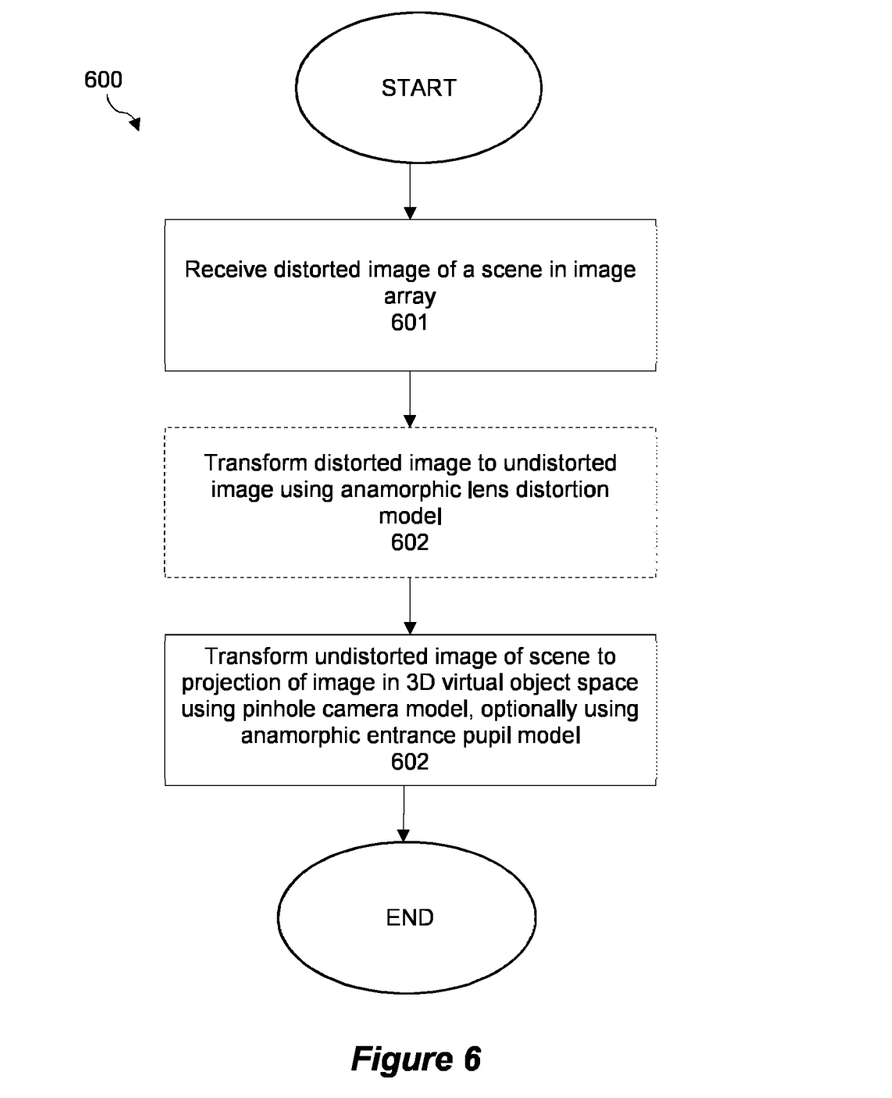
FIG. 6 shows an example image workflow process for transforming a distorted image characteristic of the anamorphic imaging system to a projection of the image in 3D object space using a pinhole camera model, anamorphic entrance pupil model and anamorphic lens distortion model, in accordance with an aspect of the present disclosure.

Turning now to FIG. 6, the workflow process 600 is for transforming from a distorted image of a scene of objects in a three-dimensional object space to a projection of the image in a three-dimensional virtual object space to negate the effect of capturing the scene using an anamorphic lens.

In step 601, a distorted image of the scene of objects in a three-dimensional object space is received by the image processing workflow module 119, for example from information source 111, and stored in the image array 115. The distorted image of the scene may be an image of a real world three-dimensional object space captured by the anamorphic lens.

In step 602, the image processing workflow module 119 transforms the distorted image of a scene in the image array 115 to an undistorted version of the image in the image array 115 using the anamorphic lens distortion model 116.

Then, in step 603, the image processing workflow module 119 transforms the undistorted image of the scene in the image array 115 into a projection of the image in a three-dimensional virtual object space using a pinhole camera model for the anamorphic lens in the three-dimensional object space. Thereafter the process for transforming the image ends and may be repeated, for example, for subsequent image frames in a video.

In embodiments, the anamorphic entrance pupil model 117 determined as described above may be used to define where the rays pass through the entrance pupil to adapt the pinhole camera model. In embodiments, the distorted image of the scene is an image of a real world three-dimensional object space captured by the anamorphic lens.

In this way a real world image captured by the anamorphic imaging system can for example be projected into a virtual object space, allowing virtual objects in the virtual object space to be synthesised together with scene captured by the real world image. Thereafter the process 500 could be used to create a distorted image of the scene of the virtual object space including the real world image, as if captured by the anamorphic imaging system. In this way, compositing of computer generated objects in real world footage captured by an anamorphic lens is also enabled.

Although in the process 600 above, in the intervening step 602 an undistorted image is generated, in embodiments, the undistorted image may not be generated and, rather, the process 600 may operate the pinhole camera model (optionally adapted by the anamorphic entrance pupil model 117) and anamorphic lens distortion model 116 together in one step, such that the locations in a distorted image of the scene stored in image array 115 are mapped directly to rays in the 3D object space.

The processes 500 and 600 shown in FIGS. 5 and 6 are just examples and other workflows using the image processing apparatus 110 are possible. For example, captured distorted images may be transformed by the image processing apparatus 110 in which is may be easier to edit and add computer generated images, before subsequent distortion again to recreate the effects of the anamorphic imaging system.

The invention claimed is:

1. Apparatus for transforming between distorted and undistorted images to compensate for geometric distortion in images caused by an anamorphic lens, comprising:
one or more processors;
memory storing:
one or more image arrays each storing:
a distorted image representative of pixel values of an image of a scene in a three-dimensional object space captured in a two-dimensional image space on an image plane by an imaging system having an anamorphic lens; or
an undistorted image representative of pixel values of a distortion-compensated image of the scene in the three-dimensional object space captured in a two-dimensional image space in which information at locations in the image plane in the distorted image have been transformed to remove the geometrical distortion effects of the anamorphic lens; and
instructions for configuring one or more of the processors to transform between the distorted image and the undistorted image using an anamorphic lens distortion model to map pixel values at locations in the distorted image to pixel values at locations in the undistorted image, the anamorphic lens distortion model having the following polynomial relation:

$$x' = x + \sum_{i=0}^{7}\sum_{j=0}^{7} D_{x_{i,j}} \cdot x^i \cdot y^j \quad (1)$$

$$y' = y + \sum_{i=0}^{7}\sum_{j=0}^{7} D_{y_{i,j}} \cdot x^i \cdot y^j \quad (2)$$

where x and y specify points in the distorted image, x' and y' specify the transformed undistorted points in the undistorted image, $D_{x_{i,j}}$ are the x axis distortion coefficients, and $D_{y_{i,j}}$ are the y axis distortion coefficients, and wherein distortion coefficients $D_{x_{i,j}}$ and $D_{y_{i,j}}$ are non-zero for i+j=2 to characterise a decentre of the lens;

wherein the anamorphic lens distortion model is usable by the apparatus to generate the undistorted image in the image array from the distorted image, and vice versa, or to generate the distorted image based on the scene of objects in the three-dimensional object space and a pinhole camera model for the anamorphic lens in the three-dimensional object space.

2. Apparatus as claimed in claim 1, wherein the coefficients $D_{x_{i,j}}$ are non-zero for i+j=3, 5, 7 where i is odd and j is even.

3. Apparatus as claimed in claim 2, wherein the coefficients $D_{y_{i,j}}$ are non-zero for i+j=3, 5, 7 where i is even and j is odd.

4. Apparatus as claimed in claim 3, wherein all other coefficients in $D_{x_{i,j}}$ and $D_{y_{i,j}}$ are zero or null.

5. Apparatus as claimed claim 1, wherein the memory further comprises instructions to:

determine, for locations (x, y) in the distorted image, locations ($Ref_x$, $Ref_y$) in a ray reference plane at an entrance pupil for the anamorphic lens a ray travels through from a point in the three-dimensional object space using an anamorphic entrance pupil model based on the following polynomial relation:

$$Ref_x = S_{x_3} \cdot x^3$$

$$Ref_y = S_{y_1} \cdot y + S_{y_3} \cdot y^3$$

where $S_{x_3}$, $S_{y_1}$, and $S_{y_3}$ are anamorphic entrance pupil shift coefficients.

6. Apparatus as claimed claim 5, wherein the memory further comprises instructions to:
transform the scene of objects in the three-dimensional object space into an undistorted image of the scene in the image array using the pinhole camera model for the anamorphic lens in the three-dimensional object space, and using the anamorphic entrance pupil model to define where the rays pass through the entrance pupil; and
transform the undistorted image of the scene in the image array to a distorted version of the image in the image array using the anamorphic lens distortion model.

7. Apparatus as claimed in claim 6, wherein the three-dimensional object space is a virtual object space comprising computer-generated objects, and wherein the distorted version of the image of the scene in the virtual object space created using the pinhole camera model, anamorphic lens distortion model and optionally the anamorphic entrance pupil model, is overlaid on an image of a real world three-dimensional object space captured by the anamorphic lens.

8. Apparatus as claimed in claim 5, wherein the memory further comprises instructions to:
transform the distorted image of the scene in the image array to an undistorted version of the image in the image array using the anamorphic lens distortion model; and
transform the undistorted image of the scene in the image array into a projection of the image in a three-dimensional virtual object space using the pinhole camera model for the anamorphic lens in the three-dimensional object space, and using the anamorphic entrance pupil model to define where the ray pass through the entrance pupil.

9. Apparatus as claimed in claim 8, wherein the distorted image of the scene is an image of a real world three-dimensional object space captured by the anamorphic lens.

10. Apparatus as claimed in claim 5, wherein the memory further comprises instructions to:
receive real world distorted images captured by the anamorphic lens of test grid markings having known spacings taken at a different distances from the anamorphic lens along the optical axis in the real world three-dimensional object space;
determine locations of the distorted test grid markings in the image array;
determine values of the distortion coefficients $D_{x_{i,j}}$ and $D_{y_{i,j}}$ to transform the distorted grid markings to an undistorted grid of markings based on the known spacings and centred on the optical axis; and store the determined values as the values of the distortion coefficients $D_{x_{i,j}}$ and $D_{y_{i,j}}$ in the anamorphic lens distortion model stored in memory.

11. Apparatus as claimed in claim 10, wherein the memory further comprises instructions to:
determine values of the anamorphic entrance pupil shift coefficients $S_{x_3}$, $S_{y_1}$, and $S_{y_3}$ based on the locations (x, y) of the distorted test grid markings in the image array for near field test grids to determine the anamorphic entrance pupil model; and
store the determined values as the values of the anamorphic entrance pupil shift coefficients $S_{x_3}$, $S_{y_1}$, and $S_{y_3}$ in the anamorphic entrance pupil model stored in memory.

12. Apparatus as claimed in claim 11, wherein the distortion coefficients $D_{x_{i,j}}$ and $D_{y_{i,j}}$ and optionally the anamorphic entrance pupil shift coefficients $S_{x_3}$, $S_{y_1}$, and $S_{y_3}$ are determined using an optimisation algorithm to fit the anamorphic lens distortion model and optionally the anamorphic entrance pupil model to generate the locations of the distorted test grid markings in the image array.

13. A method, using the apparatus of claim 5, of transforming from the scene of objects in a three-dimensional object space to an image plane to recreate the effect of capturing the scene using an anamorphic lens, the method comprising:
transforming a scene of objects in a three-dimensional object space into an undistorted image of the scene in the image array using a pinhole camera model for the anamorphic lens in the three-dimensional object space, and using the anamorphic entrance pupil model to define where the ray pass through the entrance pupil; and
transforming the undistorted image of the scene in the image array to a distorted version of the image in the image array using the anamorphic lens distortion model.

14. A method as claimed in claim 13, wherein the three-dimensional object space is a virtual object space comprising computer-generated objects, and wherein the distorted version of the image of the scene in the virtual object space created using the pinhole camera model, the anamorphic entrance pupil model and the anamorphic lens distortion model is overlaid on an image of a real world three-dimensional object space captured by the anamorphic lens.

15. A method, using the apparatus of claim 5, of transforming from the distorted image of the scene of objects in the three-dimensional object space to a projection of the image in a three-dimensional virtual object space to negate the effect of capturing the scene using an anamorphic lens, the method comprising:
transforming the distorted image of the scene in the image array to an undistorted version of the image in the image array using the anamorphic lens distortion model; and
transforming the undistorted image of the scene in the image array into a projection of the image in a three-dimensional virtual object space using the pinhole camera model for the anamorphic lens in the three-dimensional object space, and using the anamorphic entrance pupil model to define where the ray pass through the entrance pupil.

16. A method as claimed in claim 15, wherein the distorted image of the scene is an image of a real world three-dimensional object space captured by the anamorphic lens.

17. A non-transitory computer readable medium storing instructions for configuring one or more processors to transform between distorted and undistorted images to compensate for geometric distortion in images caused by an anamorphic lens, the distorted and undistorted images being stored in respective image arrays, the distorted image representative of pixel values of an image of a scene in a three-dimensional object space captured in a two-dimensional image space on an image plane by an imaging system having an anamorphic lens, and the undistorted image representative of pixel values of a distortion-compensated image of the scene in the three-dimensional object space captured in a two-dimensional image space in which information at locations in the image plane in the distorted image have been transformed to remove the geometrical distortion effects of the anamorphic lens, the instructions for configuring one or more of the processors to transform between the distorted image and the undistorted image using an anamorphic lens distortion model to map pixel values at locations in the distorted image to pixel values at locations in the undistorted image, the anamorphic lens distortion model having the following polynomial relation:

$$x' = x + \sum_{i=0}^{7}\sum_{j=0}^{7} D_{x_{i,j}} \cdot x^i \cdot y^j \tag{1}$$

$$y' = y + \sum_{i=0}^{7}\sum_{j=0}^{7} D_{y_{i,j}} \cdot x^i \cdot y^j \tag{2}$$

where x and y specify points in the distorted image, x' and y' specify the transformed undistorted points in the undistorted image, $D_{x_{i,j}}$ are the x axis distortion coefficients, and $D_{y_{i,j}}$ are the y axis distortion coefficients, and wherein distortion coefficients $D_{x_{i,j}}$ and $D_{y_{i,j}}$ are non-zero for i+j=2 to characterise a decentre of the lens; and wherein the anamorphic lens distortion model is usable by the apparatus to generate the undistorted image in the image array from the distorted image, and vice versa, or to generate the distorted image based on the scene of objects in the three-dimensional object space and a pinhole camera model for the anamorphic lens in the three-dimensional object space.

18. The non-transitory computer readable medium claimed in claim 17 further storing instructions for configuring one or more of the processors to:
determine, for locations (x, y) in the distorted image, locations ($Ref_x$, $Ref_y$) in a ray reference plane at an entrance pupil for the anamorphic lens a ray travels through from a point in the three-dimensional object space using an anamorphic entrance pupil model based on the following polynomial relation:

$$Ref_x = S_{x_3} \cdot x^3$$
$$Ref_y = S_{y_1} \cdot y + S_{y_3} \cdot y^3$$

where $S_{x_3}$, $S_{y_1}$, and $S_{y_3}$ are anamorphic entrance pupil shift coefficients.

* * * * *